United States Patent Office 3,733,310
Patented May 15, 1973

3,733,310
PROCESS FOR THE MANUFACTURE OF POLYURETHANE SPINNING AND COATING SOLUTIONS
Roxburgh Richmond Aitken, Manchester, England, assignor to Imperial Chemical Industries Limited, London, England
No Drawing. Continuation-in-part of application Ser. No. 52,762, July 6, 1970. This application Feb. 22, 1972, Ser. No. 228,259
Claims priority, application Great Britain, July 24, 1969, 37,281/69
Int. Cl. C08g 22/14, 22/16
U.S. Cl. 260—77.5 AQ       3 Claims

ABSTRACT OF THE DISCLOSURE

A process for the manufacture of a solution of a polyurethane containing isocyanate-reactive groups which comprises reacting together in an inert solvent an essentially linear hydroxyl-ended polymer, an at least trifunctional polyol and an excess of an organic diisocyanate to form an isocyanate-ended prepolymer, then adding a dihydric alcohol or a mixture thereof with water and allowing reaction to proceed until the solution has attained a viscosity within a predetermined range, and finally adding a polyfunctional isocyanate-reactive compound in which the isocyanate-reactive groups are of different reactivity in amount such that there is one molecule of such compound for each isocyanate group still present.

---

This application is a continuation-in-part of copending application Ser. No. 52,762, filed July 6, 1970, now abandoned.

This invention relates to a process for the manufacture of polyurethanes. More particularly, it relates to a process for the manufacture of solutions of polyurethanes containing isocyanate-reactive groups, to the products so obtained, and to the use of such solutions in the formation of adhesives, lacquers, coatings and fibres.

There has been previously described a process for the manufacture of solutions of polyurethanes by reacting together in a solvent inert to isocyanate groups a mixture of an essentially linear hydroxy-ended polyester, polyesteramide or polyether with an organic diisocyanate in certain proportions such that the polyester, polyesteramide or polyether has been substantially converted into an isocyanate-ended condensation product, thereafter adding water or a dihydric alcohol or a mixture of water and dihydric alcohol in an amount which provides from 0.85–1.2 isocyanate-reactive hydrogen atoms for each isocyanate group still remaining, continuing the reaction until the solution has attained a viscosity within a pre-determined range, and then adding a poly-functional isocyanate-reactive compound, in which isocyanate-reactive groups of different reactivity are present, in amount such that there is at least one molecule of such compound for each isocyanate group present.

We have now found that polyurethane solutions which can be used for the production of adhesives, lacquers, coatings and fibres having improved physical properties are obtained by the above process when together with the essentially linear polyester, polyesteramide or polyether there is also used a small proportion of a polyol having a functionality of three or more.

Accordingly, the present invention provides a process for the manufacture of a solution of a polyurethane containing isocyanate-reactive groups, which comprises reacting together in a solvent inert to isocyanate groups a mixture of an essentially linear hydroxyl-ended polyester, polyesteramide or polyether, an at least tri-functional polyol and an organic diisocyanate in proportions providing 1.15 to 1.80 isocyanate groups for each hydroxyl group until the polyester, polyesteramide or polyether and the at least trifunctional polyol have been substantially converted into an isocyanate-ended product, thereafter adding a dihydric alcohol or a mixture of water and a dihydric alcohol containing at least 50% molar of the dihydric alcohol in an amount which provides from 0.85 to 1.2 isocyanate reactive hydrogen atoms for each isocyanate reactive hydrogen atoms for each isocyanate group still remaining, continuing the reaction until a viscosity is obtained having a predetermined value in the range of 1 to 1500 poises at 25° C. whereupon a polyfunctional isocyanate-reactive compound in which isocyanate reactive groups of different reactivity are present is added in such an amount that there is at least one molecule of such compound for each isocyanate group present.

It is to be understood that water provides two isocyanate-reactive hydrogen atoms per molecule in calculating the amount to be used.

The hydroxyl-terminated polyesters and polyester amides used in the process of our invention should be essentially linear and may be prepared by conventional methods, for example from dicarboxylic acids, glycols and, as necessary, minor proportions of diamines or aminoalcohols. Suitable dicarboxylic acids include, for example, succinic, glutaric, adipic, suberic, azealic, sebacic, phthalic, isophthalic and terephthalic acids and mixtures of these. Suitable glycols include, for example, ethylene glycol, 1,2-propylene-glycol, 1,3-butylene glycol, 2,3-butyleneglycol, diethylene glycol, tetramethylene glycol, pentamethylene glycol, hexamethylene glycol, decamethylene glycol and 2,2-dimethyltrimethylene glycol. Suitable diamines or aminoalcohols include, for example, hexamethylene diamine, ethylene diamine, monoethanolamine, phenylenediamines and benzidine. Small proportions of polyhydric alcohols for example glycerol or trimethylolpropane may also be used, but large amounts of such compounds lead to undesirable solvent-insolubility. The polyesters and polyesteramides should preferably have acid value less than 5 mg. KOH/g. and a molecular weight between 800 and 5000, and preferably between 1000 and 2700. Mixtures of polyesters and polyesteramides may be used if desired.

As examples of polyethers which can be used there may be mentioned polymers and copolymers of cyclic oxides, for example 1,2-alkylene oxides such as ethylene oxide, epichlorohydrin, 1,2-propylene oxide, 1,2-butylene oxide and 2,3-butylene oxide, oxycyclobutane and substituted oxycyclobutanes and tetrahydrofuran. There may also be mentioned polyethers obtained by the polymerisation of an alkylene oxide in the presence of a basic catalyst and water, glycol or a primary monoamine. Mixtures of such polyethers may be used.

Examples of suitable organic diisocyanates include aliphatic diisocyanates, for example hexamethylene diisocyanate, aromatic diisocyanates, for example, tolylene-2,4-diisocyanate,
tolylene-2,6-diisocyanate,
diphenylmethane-4,4'-diisocyanate,
3-methyldiphenylmethane-4,4'-diisocyanate,
m- and p-phenylenediisocyanate,
chlorophenylene-2,4-diisocyanate,
naphthylene-1,5-diisocyanate,
naphthylene-1,4-diisocyanate,
diphenyl-4,4'-diisocyanate,
4,4'-diisocyanate-3,3'-dimethyldiphenyl,
diphenylether diisocyanates, and
cycloaliphatic diisocyanates for example dicyclohexylmethane diisocyanate and methylcyclohexyldiisocyanate. Mixtures of these diisocyanates may be used, the preferred diisocyanate being a mixture of 2,4- and 2,6-tolylene diisocyanates containing about 80% of the 2,4-isomer.

As examples of dihydric alcohols which may be used in the present process there may be mentioned ethylene glycol, propylene glycol, 1,3-, 1,4- and 2,3-butanediols, diethylene glycol, dipropylene glycol, pentamethylene glycol, hexamethylene glycol, neopentyl glycol and low molecular weight reaction products of these dihydric alcohols with ethylene oxide or propylene oxide.

As examples of polyfunctional isocyanate-reactive compounds containing isocyanate-reactive groups of different reactivity which may be used, there may be mentioned aliphatic primary or secondary amines containing a hydroxyl group and also o-hydroxybenzyl alcohols, for example, monoethanolamine, diethanolamine, N - methylethanolamine, 2-amine-2-methylpropan-1-ol, iso-propanolamine, 2-(2'-aminoethoxy)ethanol, saligenin and 2-hydroxy-3,5-dimethylbenzyl alcohol.

As examples of solvents which are inert towards isocyanate groups there may be mentioned esters, ketones, aromatic hydrocarbons and chlorohydrocarbons. Mixtures of solvents may be used. The amount of solvent used is preferably sufficient to give a solution containing from 10 to 80% by weight of polyurethane.

As examples of at least trifunctional polyols which may be used in the process of the present invention may be mentioned glycerol, trimethylolpropane, trimethylolethane and 1,2,6-hexanetriol but the preferred polyol is trimethylolpropane.

The polyol may be used in an amount of up to 5% by weight based on the weight of polyester, polyesteramide or polyether used: it is preferred to use up to 2.5% by weight.

The present process is particularly applicable to polyesters and polyethers, especially the latter. A preferred polyether for use in the process is polytetrahydrofuran.

The purpose of adding the polyfunctional isocyanate-reactive compound at a predetermined viscosity is to react quickly with free isocyanate groups and stop as quickly as possible the chain extension and cross-linking reactions taking place in the solution and which would cause a further rise in viscosity. It is essential, therefore, that the polyfunctional isocyanate-reactive compound should contain one group which is highly reactive towards the isocyanate group and that the other isocyanate reactive group or groups should exhibit a lower reactivity. In this way, a product is obtained which is free from isocyanate groups and which contains isocyanate-reactive groups.

The reaction may be carried out at temperatures between 20 and 130° C., and is preferably carried out at a temperature of from 35 to 80° C., in the presence of a catalyst of the kind which accelerates reaction between an isocyanate group and a hydroxyl group. As examples of such catalysts there may be mentioned organic and inorganic basic compounds, and soluble organic compounds of metals, for example of transition metals, such as iron and manganese acetyl acetonate, and of tin and antimony, for example dibutyl tin dilaurate and stannous octoate, and compounds of lead such as lead acetate, basic lead acetate and lead 2-ethylhexoate. As basic organic catalysts tertiary amines are suitable, particularly 4-dimethylaminopyridine, triethylenediamine, dimethylbenzylamine, and dimethylcyclohexylamine. The preferred catalyst is 4-dimethylaminopyridine. The amount of catalyst used will depend upon its activity, the temperature used and rate of reaction desired, but in general, a weight between 0.005 ond 1.0% by weight of the polyester, polyesteramide or polyether will be appropriate.

In carrying out the new process it is not necessary to completely remove isocyanate-reactive impurities from the hydroxyl-ended polyester, polyesteramide or polyether hereinafter referred to as polymer) and solvent. The main impurity is water and amounts of this up to about 0.1% of the combined weight of the solvent and polymer can be tolerated. However, it is generally preferred to control the quantities of impurities present within defined limits, if necessary by making additions of such impurities. The reaction can be readily followed by regular checks of the isocyanate content of the reaction mixture; this can be done by any standard analytical method. In this way it is found that reaction between the polymer and the diisocyanate proceeds quickly until an isocyanate-ended condensation product is formed, as shown by a rapid fall in isocyanate content changing over a relatively short period of time to an almost constant value.

After adding the dihydric alcohol, or mixtures thereof with water as hereinbefore defined, the course of the reaction can be followed by viscosity measurements, e.g., by measuring the viscosities of samples taken from the reaction vessel or by measuring the power required to turn the vessel stirrer at a constant speed, and, as the required viscosity is approached, measurements of the isocyanate value are again taken so as to determine the amount of polyfunctional isocyanate reactive compound to add. It is preferred to add a slight excess over that calculated to be necessary for the more reactive polyfunctional group only to react with the isocyanate groups present in the reaction product. Under such circumstances, when the polyfunctional isocyanate reactive agent possesses an amine group the final product will contain some unreacted amine groups. Since it has been found that the presence of such groups may lead to a decrease in viscosity of the product on prolonged storage it is usually desirable to remove them by adding a compound, such as diethyl oxalate, which reacts readily with amines at the reaction temperature.

When a catalyst is used, subsequent deactivation with, for example, an acidic compound is desirable, since such catalysts if left in the reaction mixture may give rise to shortened storage life or pot life at the application stage. Examples of suitable acidic compounds include organic acids, such as adipic acid, salicylic acid and trichloroacetic acid and inorganic acids such as phosphoric acid and sulphur dioxide.

The solutions prepared by the process of the invention having a viscosity of 300 poise or over and a solids content of 40% or below and of especial value in the manufacture of flexible coatings where no subsequent heat treatment is possible. Substrates for these include knitted, woven or felted textiles of natural, artificial or synthetic materials, rubber, paper, wood, leather, metals, glass, plastics such as polyvinyl chloride and polyurethane materials such as flexible and rigid foams.

The solutions having a viscosity below 300 poise and solids content of 40% or above are advantageous when used as adhesives in the lamination of sheet materials. Examples of such materials are knitted, woven or felted textiles, flexible foams made from polyvinyl chloride or polyurethane and plastic films. Using an adhesive solution according to our invention, a bond may be made between these materials by conventional laminating techniques having excellent fastness to heat, washing and solvents.

For application to these substrates the solutions are mixed with organic polyisocyanates which may contain two or more isocyanate groups, applied to the substrates by any conventional method, and the coatings as obtained are cured at suitable temperatures which may lie between room temperature and 180° C. Organic polyisocyanates which can be used for curing include those known from the prior art to be useful for the preparation of polyurethanes, for example those diisocyanates mentioned above as suitable for the preparation of the polyurethane soluiton, but it is preferred to use polyisocyanates containing more than two isocyanate groups per molecule. Typical examples of such polyisocyanates include the reaction product of an excess of an organic diisocyanate with a trihydric alcohol or a mixture of dihydric and trihydric alcohols and isocyanate group-containing isocyanurate polymers of diisocyanates and polyisocyanates, as well as aromatic triisocyanates such as 2:4:4'-triisocyanatodiphenylether and 2,6 - triisocyanatotoluene. The proportion of polyisocyanate used for curing is desirably from about 8% to 25% by weight of the solids content of the polyurethane solution, but amounts outside this range may be used if desired. When diisocyanates or polyisocyanates are used curing temperatures preferably should be between room temperature and 100° C. Isocyanate generators, such as adducts of polyisocyanates with phenols may also be used, in which case curing temperatures between 70° C. and 180° C. are necessary.

The polyurethane solutions may also be converted, preferably after the addition of further polyisocyanate, into elastomeric filaments by conventional wet or dry spinning methods. The inert organic solvent may for example be removed by spinning into a solvent which is miscible with the inert organic solvent but is not a solvent for the polymer or by passing a stream of hot gas such as air over the filament after spinning.

The invention is illustrated but not limited by the following examples in which all parts and percentages are by weight unless otherwise stated.

EXAMPLES 1–6

The following general method is applicable to the preparation of the polyurethane solutions of the invention, details of the reactants, their quantities and of the resulting products being given for each stage of the process in Table 1.

First stage

The polyester, polyesteramide or polyether and trimethylolpropane are charged to a reaction vessel from which the air has been previously displaced by a stream of nitrogen. Ethyl acetate is added and the resulting mixture is stirred at 60° C. until a homogeneous solution is obtained. The water content of the solution is then measured and should be below 0.07%. If a value below 0.05% is obtained, sufficient water is added to bring the water content up to 0.05%. 4-dimethylaminopyridine (catalyst) is then added followed by an 80:20 mixture of 2,4- and 2,6-tolylene diisocyanates. The reaction mixture is then stirred at 60° C. for 12 hours.

Second stage

A sample of the reaction product obtained at the conclusion of the first stage is then analyzed for isocyanate content, and an amount of dihydric alcohol or dihydric alcohol/water mixture equivalent to the isocyanate content is added, after which the reaction is continued at the temperature specified in Table 1 until the viscosity of the solution reaches the required level. Isopropanolamine in sufficient quantity for all of the residual isocyanate groups, again as determined by analysis, to react with only the amine groups in the isopropanolamine but including a slight excess, is then added and reaction is continued. After reaction for 1 hour at the specified temperature salicyclic acid and diethyl oxalate are added and the reaction is completed by stirring for 1 hour at the specified temperature.

TABLE 1

| | Example | | | | | |
|---|---|---|---|---|---|---|
| | 1 | 2 | 3 | 4 | 5 | 6 |
| Polyester/polyether | Polytetrahydrofuran | Polytetrahydrofuran | Polytetrahydrofuran | Polytetrahydrofuran | Polytetrahydrofuran | Polyester [1] |
| Molecular weight | 1,000 | 1,000 | 1,000 | 1,000 | 2,000 | 1,710. |
| Parts of polyester/polyether | 5,000 | 4,964 | 248.2 | 248.2 | 250 | 250. |
| Parts of trimethylolpropane | 115 | 115 | 2.9 | 1.45 | 5.75 | 2.5. |
| Parts of ethyl acetate | 8,160 | 8,100 | 386 | 379 | 376.5 | 375.2. |
| Water content of solution | 0.0055 | 0.7 | 0.055 | 0.05 | 0.07 | 0.06. |
| Parts of water added | Nil | Nil | Nil | Nil | Nil | Nil. |
| Parts of 4-dimethylamino pyridine | 1.25 | 5.0 | 0.25 | 0.25 | 0.06 | 0.25. |
| Parts of tolylene diisocyanate | 1,422 | 1,422 | 63.9 | 60.2 | 42.3 | 39.4. |
| Isocyanate content at end of first stage | 0.992 | 0.963 | 0.88 | 0.86 | 0.663 | 0.39. |
| Constitution of dihydric alcohol or dihydric alcohol/water mixture | 1.4-butane butane diol | Equimolecular mixture of water/ethylene glycol. | 1.4-butane diol | 1.4-butane diol | 1.4-butane diol | Equimolecular mixture of water/ethylene glycol. |
| Parts of dihydric alcohol or dihydric alcohol/water mixture | 154 | 66.85 | 6.41 | 6.17 | 4.7 | 1.17. |
| Reaction temperature (° C.) | 45 | 45 | 60 | 60 | 60 | 60. |
| Isocyanate content: stage 2 | 0.276 | 0.464 | 0.19 | 0.40 | 0.305 | 0.12. |
| Parts of isopropanolamine | 81.5 | 143 | 2.73 | 4.93 | 3.81 | 2.0. |
| Parts of salicylic acid | 2.83 | 11.3 | 0.57 | 0.57 | 0.14 | 0.41. |
| Parts of diethyl oxalate | 50.5 | 51.4 | 2.33 | 2.19 | 2.19 | 2.1. |
| Viscosity of solution at 25° C. | 303 | 237 | 454 | 791 | 455 | >1,000. |
| Solids Content (percent) | 44.9 | 44.5 | 46.4 | 46.8 | 45.0 | 46.8. |

[1] The polyester used was prepared by condensing 2,598 parts of adipic acid with 1,181.4 parts of ethylene glycol and 106.2 parts of diethylene glycol and had a hydroxyl value of 63.1 mg. KOH/g., acid value 2.6 mg. KOH/g. and viscosity at 54.5° C. of 790 centistokes.

Preparation and testing of cured films from the above polyurethane solution 9 parts of a 75% polyisocyanate soltuion in ethyl acetate, obtained by reacting an 80:20 mixture of 2,4- and 2,6-tolylene diisocyanates with a mixture of glycerol and diethylene glycol (used in a molar ratio of 16:13 in ethyl acetate in amount such that there is 1 molar equivalent of diisocyanate for each hydroxyl group, are added to 100 parts of each of the solutions prepared as described above. The resulting mixtures are cast into films 0.2 mm. thick and are allowed to cure at 68° F. and relative humidity of 65% for 1 week. Physical test results are give in Table 2 and were obtained on standard dumb-bell pieces. The soluble fraction is determined on pieces held in methyl ethyl ketone vapour for 24 hours; the steam life is the time before a sample stored in steam at 100° C. disintegrates on handling.

TABLE 2

| Example | 1 | 2 | 3 | 4 | 5 | 6 |
|---|---|---|---|---|---|---|
| Tensile strength (kg./cm.$^2$) | 164 | 112 | 117 | 69 | 260 | 198 |
| Elongation at break (percent) | 340 | 490 | 450 | 490 | 370 | 575 |
| Permanent set (percent) | 5 | 35 | 15 | 15 | 15 | 10 |
| Modulus (kg./cm.$^2$) at extension of— | | | | | | |
| 100% | 22 | 6 | 7 | 8 | 42 | 6 |
| 300% | 128 | 51 | 43 | 29 | 163 | 17 |
| Soluble fraction (percent) | 14.5 | 39 | 22 | 41 | 13 | 21 |
| Steam life (hours) | >200 | >200 | >156 | 84 | >200 | 66–72 |

If a mixture of a polyurethane solution according to the invention and a polyisocyanate solution is applied to a cellulose textile material and allowed to cure, there is obtained a waterproof coated fabric having excellent flexibility.

EXAMPLES 7–9

Further examples of the process using the same general method described for Examples 1–6 are given in the following Table 3.

TABLE 3

| Polyester/polyether | Example | | |
|---|---|---|---|
| | Polytetra-hydrofuran | Polytetra-hydrofuran | Polytetra-hydrofuran |
| Molecular weight | 2,000 | 2,000 | 2,000. |
| Parts of polyester/polyether | 250 | 250 | 250. |
| Parts of trimethylolpropane | 5.75 | .575 | 5.75. |
| Parts of ethyl acetate | 376.5 | 3.765 | 376.5. |
| Water content of solution | 0.06 | 0.06 | 0.06. |
| Parts of water added | Nil | Nil | Nil. |
| Parts of 4-dimethylamino pyridine | 0.06 | 0.06 | 0.06. |
| Parts of tolylene diisocyanate | 42.3 | 42.3 | 42.3. |
| Isocyanate content at end of first stage | 0.64 | 0.64 | 0.64. |
| Constitution of dihydric alcohol or dihydric alcohol/water mixture. | Neopentyl glycol. | 1,6-hexane diol. | 1,4-butane diol. |
| Parts of dihydric alcohol or dihydric alcohol/water mixture. | 5.22 | 5.92 | 4.65. |
| Reaction temperature (° C.) | 60 | 60 | 60. |
| Isocyanate content: Stage 2 | 0.315 | 0.320 | 0.250. |
| Parts of alkanolamine | 4.00 | 4.05 | 2.65. |
| | Isopropanol amine | Isopropanol amine | Monoethanol amine |
| Parts of salicylic acid | 0.14 | 0.14 | 0.14. |
| Parts of diethyl oxalate | 2.19 | 2.19 | 2.19. |
| Viscosity of solution at 25° C | 197 | 163 | 194. |
| Solids content (percent) | 44.5 | 44.8 | 45.2. |

When converted into cured films by the method described for the previous examples the properties of the films are substantially the same as those obtained from the product of Example 5. Likewise when applied to a cellulosic textile material in conjunction with a polyisocyanate as indicated previously, similar coatings are obtained.

I claim:

1. A process for the manufacture of a solution of a polyurethane containing isocyanate-reactive groups, which comprises reacting together in a solvent inert to isocyanate groups a mixture of polytetrahydrofuran, an at least tri-functional polyol and an organic diisocyanate in proportions providing 1.15 to 1.80 isocyanate groups for each hydroxyl group until the polytetrahydrofuran and the at least trifunctional polyol have been substantially converted into an isocyanate-ended product, thereafter adding a dihydric alcohol or a mixure of water and a dihydric alcohol containing at least 50 mol percent of the dihydric alcohol in an amount which provides from 0.85 to 1.2 isocyanate-reactive hydrogen atoms for each isocyanate group still remaining, said dihydric alcohol having up to 6 carbon atoms, continuing the reaction until a viscosity of 1 to 1500 poises at 25° C. is obtained whereupon a compound selected from the group consisting of ethanolamine and isopropanolamine is added in such an amount that there is at least one molecule of such compound for each isocyanate group present.

2. A process as set forth in claim 1 in which said compound is ethanolamine.

3. A process for the manufacture of a solution of a polyurethane containing isocyanate-reactive groups, which comprises reacting together in a solvent inert to isocyanate groups a mixture of polytetrahydrofuran, an at least trifunctional polyol and an organic diisocyanate in proportions providing 1.15 to 1.80 isocyanate groups for each hydroxyl group until the polytetrahydrofuran and the at least trifunctional polyol have been substantially converted into an isocyanate-ended product, thereafter adding a dihydric alcohol or a mixure of water and a dihydric alcohol containing at least 50 mol percent of the dihydric alcohol in an amount which provides from 0.85 to 1.2 isocyanate-reactive hydrogen atoms for each isocyanate group still remaining, said dihydric alcohol having up to 4 carbon atoms, continuing the reaction until a viscosity of 1 to 1500 poises at 25° C. is obtained whereupon isopropanolamine is added in such an amount that there is at least one molecule of such compound for each isocyanate group present.

References Cited
UNITED STATES PATENTS

| 3,373,143 | 3/1968 | Chilvers et al. | 260—75 |
| 3,503,934 | 3/1970 | Chilvers et al. | 260—75 |
| 3,428,611 | 2/1969 | Brotherton et al. | |
| 3,635,907 | 1/1972 | Schulze et al. | |
| 3,678,009 | 7/1972 | Lohse et al. | |

DONALD E. CZAJA, Primary Examiner

H. S. COCKERAM, Assistant Examiner

U.S. Cl. X.R.

8—115.6; 161—190; 260—2.5 A, 77.5 AQ, 77.5 SP